US011866964B2

(12) United States Patent
Wilke et al.

(10) Patent No.: US 11,866,964 B2
(45) Date of Patent: Jan. 9, 2024

(54) DOOR HANDLE ARRANGEMENT FOR A VEHICLE

(71) Applicant: ILLINOIS TOOL WORKS INC., Glenview, IL (US)

(72) Inventors: Zsolt Wilke, Bad Mergentheim (DE); Matthias Seubert, Giebelstadt (DE); Roland Och, Rottendorf (DE); Brian Svec, Castro Valley, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/478,309

(22) Filed: Sep. 17, 2021

(65) Prior Publication Data

US 2022/0074243 A1 Mar. 10, 2022

Related U.S. Application Data

(63) Continuation of application No. 16/015,942, filed on Jun. 22, 2018, now Pat. No. 11,136,796.

(30) Foreign Application Priority Data

Jun. 29, 2017 (DE) ..................... 10 2017 114 493.5

(51) Int. Cl.
*E05B 85/10* (2014.01)
*E05B 85/16* (2014.01)
*E05B 79/06* (2014.01)

(52) U.S. Cl.
CPC ............ *E05B 85/103* (2013.01); *E05B 79/06* (2013.01); *E05B 85/16* (2013.01)

(58) Field of Classification Search
CPC ...... E05B 85/00; E05B 85/003; E05B 85/006; E05B 85/10; E05B 85/14; E05B 85/16;
(Continued)

(56) References Cited

U.S. PATENT DOCUMENTS 3,153,552 A * 10/1964 Sandor .................... E05B 85/14
292/336.3
2006/0186679 A1* 8/2006 Koelle .................... E05B 85/16
292/347
(Continued)

FOREIGN PATENT DOCUMENTS

CN 101659193 A 3/2010
CN 103069088 A 4/2013
(Continued)

*Primary Examiner* — Christine M Mills
*Assistant Examiner* — Christopher F Callahan
(74) *Attorney, Agent, or Firm* — THOMPSON HINE LLP

(57) ABSTRACT

A door handle arrangement for a vehicle includes a housing which is fastenable to a body part of a vehicle body, and a handle lever which is mounted in a handle cutout of the housing so as to be movable between an inoperative position and an actuating position in order to unlock and/or open a vehicle door. The handle lever is mounted with play in the housing. At least one compensating element is provided which is designed to be fastened to at least one fastening portion of the body part. The compensating element forms at least one contact portion for the handle lever. The handle lever is pretensioned into its inoperative position against the at least one contact portion.

13 Claims, 7 Drawing Sheets

(58) Field of Classification Search
CPC ...... E05B 85/103; E05B 85/107; E05B 79/06; E05B 5/00; Y10S 292/31
See application file for complete search history.

(56) References Cited

U.S. PATENT DOCUMENTS

| | | | | |
|---|---|---|---|---|
| 2009/0039671 | A1* | 2/2009 | Thomas | E05B 81/76 296/146.1 |
| 2014/0265373 | A1* | 9/2014 | Patel | E05B 85/16 292/336.3 |
| 2015/0233154 | A1* | 8/2015 | Smart | E05B 81/90 70/237 |

FOREIGN PATENT DOCUMENTS

| | | | | |
|---|---|---|---|---|
| CN | 103097633 | A | 5/2013 | |
| CN | 103917728 | A | 7/2014 | |
| CN | 104631972 | A | 5/2015 | |
| CN | 106639685 | A | 5/2017 | |
| CN | 206158407 | U | 5/2017 | |
| DE | 102011108891 | A1 | 1/2013 | |
| EP | 1657971 | A1 | 5/2006 | |
| FR | 2988788 | | 10/2013 | |
| FR | 3034802 | | 10/2016 | |
| FR | 3034802 | A1 * | 10/2016 | E05B 79/06 |
| KR | 1020160045254 | A | 4/2016 | |
| WO | WO 2016151131 | | 9/2016 | |

* cited by examiner

DOOR HANDLE ARRANGEMENT FOR A VEHICLE

TECHNICAL FIELD

The invention relates to a door handle arrangement for a vehicle, comprising a housing which is fastenable to a body part of a vehicle body, and a handle lever which is mounted in a handle cutout of the housing so as to be movable between an inoperative position and an actuating position in order to unlock and/or open a vehicle door.

BACKGROUND

Door handle arrangements in which the handle lever ends flush with the surrounding outer side of the body are known. For actuation, the handle lever can be pivoted about a fixed pivot axis. A defined opening and closing movement of the handle lever is thereby predetermined. In practice, unavoidable dimensional and installation tolerances occur between individual components of the door handle arrangement or between the door handle arrangement and body parts to be connected to said components. For example, body parts and door handle arrangements to be fastened thereto are often produced and assembled by different companies. In order nevertheless to ensure that the handle lever can be reliably actuated during operation without the risk of striking against a body cutout or hard housing sections, a sufficiently large gap has to be provided between the handle lever and the edge of a body cutout provided for the handle lever. This is true particularly of chromium-plated handle levers. Gap sizes of at least 3 mm are required in practice. Large gap sizes are undesirable for visual reasons.

Furthermore, in particular flush door handle arrangements are currently assembled with a template which is inserted from the outer side of the vehicle body into a gap between the body part and the handle lever. This type of installation is time-consuming. In addition, the accuracy is not satisfactory not least due to a certain elasticity of the handle lever. After removal of the template, which is provided only for the installation, the handle lever regularly moves back into a different position, and therefore said handle lever no longer has the position predetermined by the template.

Starting from the explained prior art, the invention is based on the object of providing a door handle arrangement of the type mentioned at the beginning, in which gap sizes, in particular in flush door handle arrangements, can be reduced in a manner which is simple to assemble and without the risk of damage to the handle lever.

SUMMARY

For a door handle arrangement of the type mentioned at the beginning, the invention achieves the object in that the handle lever is mounted with play in the housing, in that at least one compensating element is provided which is designed to be fastened to at least one fastening portion of the body part, in that the compensating element forms at least one contact portion for the handle lever, and in that pretensioning means are provided which pretension or bias the handle lever in its inoperative position against the at least one contact portion.

The housing can be fastened, for example screwed, to a body part of a vehicle body. The vehicle can be, for example, a passenger vehicle or a truck. The body part can be composed of a metal, for example steel or aluminum. It can be a body sheet. However, the body part can also be composed of plastic. This basically applies to the entire vehicle body. The body part can itself form part of the outer surface of the vehicle. However, it is also conceivable for a body part to be involved which is fastened to a further body part which forms part of the outer surface of the vehicle. The body part and optionally the further body part have a body cutout into which the door handle arrangement or the handle lever is inserted in such a manner that the handle lever is accessible from the outside in the mounted state.

The handle lever is firstly mounted movably in the housing in order to unlock and/or open the vehicle door. In particular, the handle lever is mounted movably between an inoperative position, which is located in the housing and corresponds to the closed state of the door handle arrangement or vehicle door, and an actuating position moved out of the housing. For example, for this purpose, the handle lever can be mounted pivotably in the housing. The unlocking of the vehicle door can be undertaken purely electrically or purely mechanically or else electrically and (redundantly) mechanically. If the unlocking is undertaken exclusively electrically, the pivoting of the handle lever from the inoperative position into the actuating position serves only for opening the already unlocked door and optionally for actuating the electrical unlocking. The door can also be electrically pre-opened here over a small opening distance.

According to the invention, the handle lever is mounted movably with play in at least one play movement direction in the housing beyond the movable mounting for unlocking and/or opening the vehicle door. In the case of a vehicle, such as a passenger vehicle, three axes are generally defined with respect to the vehicle. The X axis corresponds to the horizontal longitudinal direction of the vehicle, the Y axis corresponds to the horizontal transverse axis of the vehicle, which transverse axis is perpendicular to the X axis, and the Z axis corresponds to the vertical axis. An orthogonal three-dimensional system of coordinates is thus covered by the X axis, Y axis and Z axis. In the mounted state, the handle lever can be mounted, for example, with play in the direction of the Z axis. The handle lever play provided according to the invention permits other, further degrees of freedom than the movable mounting which is provided for unlocking and/or opening the vehicle door.

According to the invention, furthermore at least one compensating element is provided which forms at least one contact portion, for example at least two contact portions, for the handle lever. Pretensioning means are provided which press the handle lever in the inoperative position against the at least one contact portion. The pretensioning means can comprise one or more pretensioning means. The pretensioning means can press the handle lever, in particular in the play movement direction, onto the at least one contact portion. If, for example, two contact portions are provided, said contact portions can be arranged, for example, offset in the longitudinal direction of the handle lever, i.e. in the direction of the X axis in the mounted state. The pretensioning means press the handle lever in particular against the at least one contact portion from a side of the handle lever that lies opposite the at least one contact portion. In this manner, the handle lever is secured in a manner defined in its position, in particular in the play movement direction, i.e., for example, the Z axis, in the inoperative position by at least two points, in the case of at least two contact portions three points. The compensating element is fastened to at least one fastening portion which is in particular formed integrally with the body part. A plurality of fastening portions can be provided. By means of the fastening portion or the fastening portions, the compensating element and therefore the at least one contact portion is positioned in a precisely defined manner with respect to the body part. This takes place according to the invention irrespective of possible tolerances between the housing, the housing mounting and the body part. The play of the handle lever permits a sufficient freedom of movement here in order to compensate for tolerances of this type by the handle lever being pressed by the pretensioning means against the at least one contact portion. The handle lever is therefore also positioned precisely with respect to the body part irrespective of possible tolerances between the housing, the housing mounting and the body part. The basic concept of the invention is therefore to position the handle lever directly with respect to the body part and not with respect to the housing. Gap sizes are therefore made possible between the handle lever and the body part or a further body part, which gap sizes are impossible in the prior art because of unavoidable tolerances. A more attractive visual appearance is produced by means of these small gap sizes that are made possible according to the invention. At the same time, the installation according to the invention is simplified in relation to the prior art.

According to the invention, the handle lever can have a galvanic surface coating (chromium plating). By means of the defined positioning according to the invention, the risk will reliably avoid damage even in the case of small gap sizes.

The handle lever can be mounted pivotably about a pivot axis for unlocking and/or opening the vehicle door. The pivot axis can run, for example, in the Z direction, i.e. in the vertical direction in the mounted state.

The handle lever can then furthermore be mounted with play on the pivot axis. In a particularly simple manner, the inner diameter of an axle sleeve placed onto the pivot axis can be greater than the outer diameter of the pivot axis. The handle lever can thus be tilted on the pivot axis, for example about a tilting axis running perpendicularly to the pivot axis. For example, only one end of the handle lever can be shifted along the pivot axis, or the ends of the handle lever can be shifted in opposite directions along the pivot axis. The handle lever can also have play along the pivot axis. It is then possible for said handle lever to be able to be displaced as a whole in a translatory manner along the pivot axis.

In a particularly practical manner, the pretensioning means can comprise a pretensioning spring. In a particularly simple manner, it can be a helical spring. In a structurally particularly simple manner, the pretensioning means, in particular the pretensioning spring, can also provide a resetting force for resetting the handle lever from the actuating position into the inoperative position.

According to a further refinement, the at least one contact portion can be arranged on a side of the handle cutout which is the lower side in the mounted state of the door handle arrangement. The pretensioning means are then arranged on the opposite upper side of the handle cutout. The handle lever is therefore pressed from the top downward onto the at least one contact portion.

According to a further refinement, it can be provided that the at least one compensating element is formed by at least one compensating sleeve, and that the at least one fastening portion of the body part is at least one fastening tab onto which the at least one compensating sleeve can be pushed. The compensating sleeve then forms the at least one contact portion. Said compensating sleeve can be inserted into the handle cutout of the housing, for example from the inner side facing away from the outer side of the vehicle in the mounted state. By pushing onto the at least one fastening tab, a precisely defined positioning of the compensating sleeve and, as a result, also of the at least one contact portion and thus the handle lever, takes place with respect to the body cutout. For securely defined positioning, for example, at least two fastening tabs can be provided. The fastening tabs can be formed, for example bent over, directly from the body material. They can be formed in particular on an edge of the body part that bounds a body cutout for the handle lever.

According to a further configuration in this regard, the compensating sleeve can be arranged on a side of the handle cutout which is the lower side in the mounted state of the door handle arrangement. The handle lever is then in turn pressed from above onto the contact portions. The fastening sleeve can furthermore be adapted to the shape of the lower side of the handle cutout. As a result, the housing can also be positioned with respect to the body part. The compensating sleeve can, for example, substantially cover the entire lower side of the handle cutout.

According to an alternative refinement, it can be provided that the at least one compensating element is formed by at least two compensating slides which are guided displaceably in guides of the housing and each form a contact portion for the handle lever, that the at least one fastening portion of the body part is formed by at least one contact surface of the body part, and that clamping means are provided with which the compensating slides can be clamped against the at least one contact surface. In this refinement, the compensating slides form the contact portions. The compensating slides are guided in a longitudinally displaceable manner in guide receptacles of the housing. For the defined positioning with respect to the body cutout of the body part, the compensating slides are displaced with the clamping means until they lie against the at least one contact surface, for example against one contact surface in each case, of the body part. As a result, the contact portions formed by the compensating slides, and therefore the handle lever in turn are positioned in a defined manner. Furthermore, when compensating slides are used, the housing position has no influence on the positioning of the handle lever.

The clamping means can comprise an eccentric and a clamping wire which is guided via the eccentric and acts on the compensating slides, wherein the clamping wire clamps the compensating slides against the at least one contact surface during rotation of the eccentric. For the installation of the handle lever, the compensating slides are first of all inserted without clamping with the clamping means into the guides of the housing. For this purpose, the eccentric is rotated into a preassembly position which does not clamp the clamping wire against the compensating slides. The eccentric is subsequently rotated, for example by 90°, into an installation position, as a result of which the clamping wire is clamped against the compensating slides, and therefore the latter are clamped against the contact surface of the vehicle body and the defined contact portions for the handle lever are thereby formed.

The at least one contact surface can be formed by a folding of an edge of the body part, which edge bounds a body cutout of the body part. The body cutout forms the opening for the handle lever, and therefore the latter is accessible from the outside. The aforementioned configuration results in a particularly defined position with respect to the body cutout. The compensating slides are then displaced in guides of the housing in particular in the Z direction.

The compensating slides can be arranged in turn on a lower side of the handle cutout which is the lower side in the mounted state of the door handle arrangement. The handle lever is then again pressed from above onto the contact portions.

According to a further refinement, the at least one compensating element can be formed from a thermoplastic, preferably polyoxymethylene (POM). The housing can also be composed of plastic, in particular a harder plastic than the compensating element. Glass-fiber-reinforced plastics (GFRP), e.g. glass fiber polyamide, are, for example, suitable for the housing. A harder plastic of this type provides sufficient stability for the housing. However, it can lead to damage in particular to galvanized handle levers if the handle levers strike against the housing. The use of a thermoplastic, such as polyoxymethylene (POM), for the compensating element and therefore the contact portions ensures that the handle lever does not suffer any damage as it is being pressed onto the contact portions. Such a plastic provides a good sliding characteristic with little abrasion and is sufficiently soft.

According to a further refinement, it can be provided that the handle lever in its actuating position is no longer in contact with the at least one contact portion formed by the at least one compensating element, and that at least two further contact portions are formed on the housing, said contact portions limiting the play of the handle lever from opposite sides of the handle lever at least in the actuating position. Actually, the handle lever passes out of contact with the at least one contact portion of the compensating element even before reaching the actuating position and after release from the inoperative position. When there are at least two contact portions arranged offset in the longitudinal direction of the handle lever, the handle lever starting from the inoperative position first of all leaves the contact portion which is further away from the pivot axis of said handle lever, and then leaves the contact portion positioned closer to the pivot axis thereof. In this refinement, further contact portions are therefore provided which prevent the handle lever from having too great a play, for example in the Z direction, in the state moved out of the housing. This could be perceived by a user as being less significant. In addition, the handle lever is guided by the further contact portions even in the state moved out of the housing and therefore striking of the handle lever, for example against the edge of a body cutout is reliably prevented. The further contact portions can come into contact here with a part of the handle lever that lies opposite the at least one contact portion of the compensating element with respect to a pivot axis of the handle lever. Said further contact portions can correspondingly be arranged shifted further into the housing of the door handle arrangement in comparison to the at least one contact portion of the compensating element. For contact against the further contact portions facing the handle lever from opposite sides, for example from the top and bottom, stop portions can be formed on the handle lever. The further contact portions formed on the housing do not lie against the handle lever, in particular in the inoperative position thereof. Since the handle lever therefore enters into a contact region with said contact portions only over the course of its movement into the actuating position, the distance between the opposite contact portions has to be somewhat greater than the distance of the contact-portion-facing outer sides of the stop portions of the handle lever. On the other hand, jamming of the handle lever between the further contact portions could occur. Consequently, even in the state partially and completely moved out of the housing, the handle lever still has a slight movement play which is predetermined by the aforementioned difference in the distances. Said play can be reduced to zero only if no component tolerances were noted, but this is not the case in practice for the reasons mentioned at the beginning. However, said play can be minimized to a value such that it is not perceived as annoying by a user. The further contact portions can likewise be formed by a thermoplastic, preferably polyoxymethylene (POM).

As already explained, the further contact portions can limit the play of the handle lever from opposite sides of the handle lever even before the actuating position is reached. This can be the case in particular at least from the time from which the handle lever is no longer placed against the at least one contact portion of the compensating element. Reliable guidance is thus ensured at all times and an undesirable "wobbling" of the handle lever is avoided.

The invention also relates to a system consisting of a body part of a vehicle and a door handle arrangement according to the invention, which is fastened with its housing to the body part. The system according to the invention can also comprise the vehicle, for example a passenger vehicle or a truck.

A body cutout for the handle lever can be formed in the outer surface of the body of the vehicle, and the handle lever in the inoperative position can end flush with the body outer surface which surrounds the body cutout. This results in a particularly attractive design.

Furthermore, in the inoperative position of the handle lever, there can be an encircling gap of less than 2 mm, preferably of at most 1 mm, between the handle lever and the edge of the body cutout. Such a small gap size is made possible by the play according to the invention of the handle lever and the at least one contact portion which is precisely defined with respect to the body cutout and against which the handle lever is pressed by the pretensioning means.

BRIEF DESCRIPTION OF THE DRAWINGS

Exemplary embodiments of the invention are explained in more detail below with reference to figures, in which, schematically.

Unless stated otherwise, the same reference signs denote identical or functionally identical objects in the figures.

DETAILED DESCRIPTION

Figure 1:
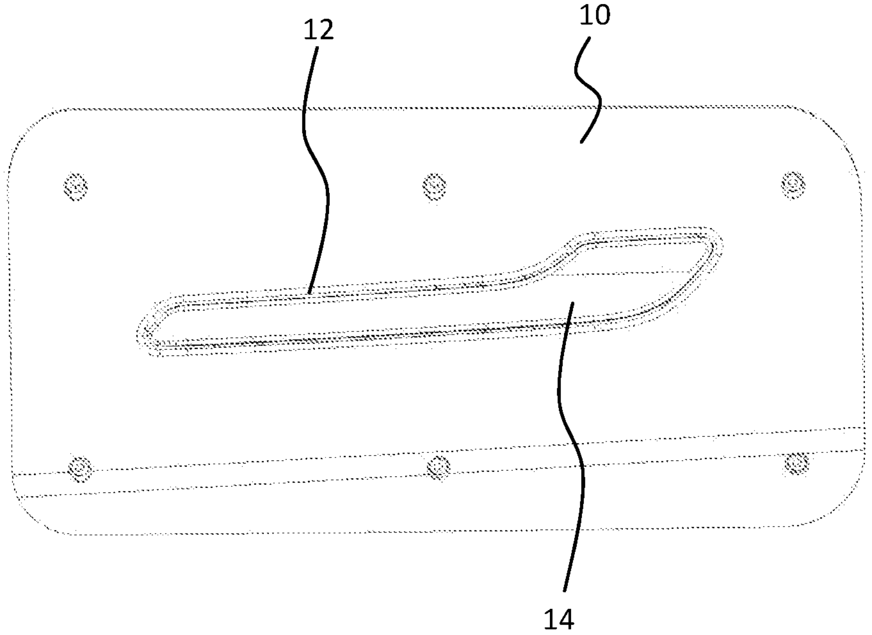
FIG. 1 shows a front view of a first exemplary embodiment of a door handle arrangement according to the invention in the state fastened to a body part.

FIG. 1 shows a body part 10 of a vehicle, such as a passenger vehicle or truck, with a body cutout 12 in which a handle lever 14 is arranged in its inoperative position. In the inoperative position shown in FIG. 1, the handle lever 14 is flush with the surrounding outer surface of the vehicle body. In addition, there is a gap which is as small as possible in each case between the handle lever 14 and the edge of the body cutout 12 of the body part 10 and the edge of the body cutout of the further body part (not illustrated).

Figure 2:
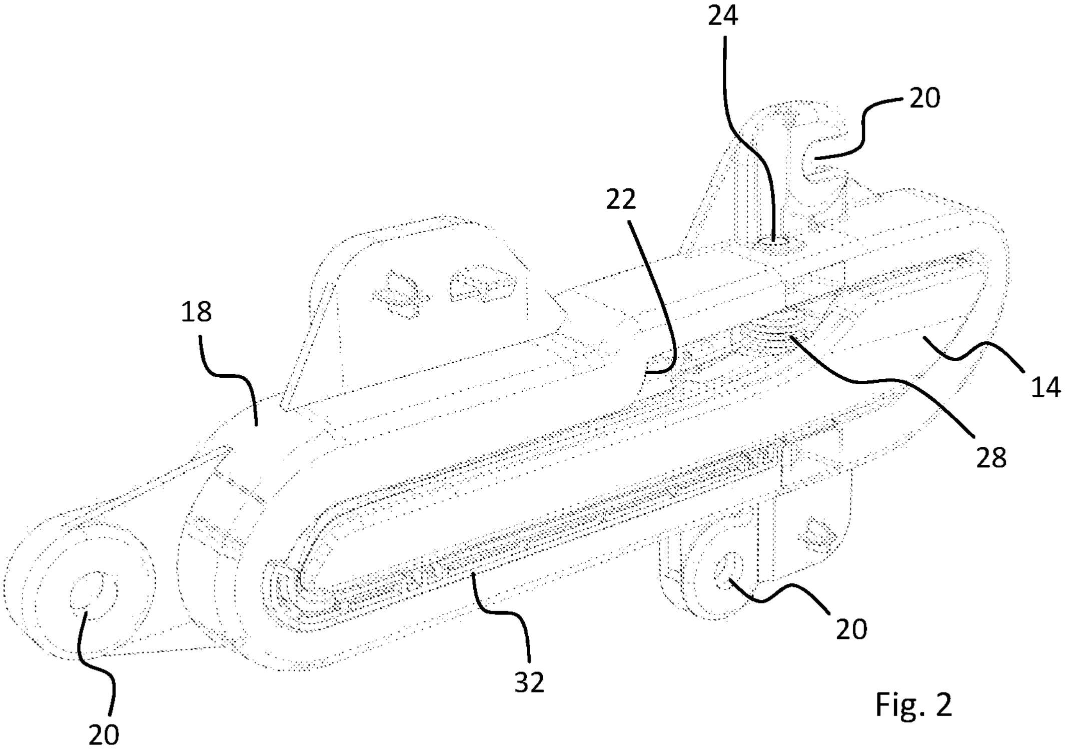
FIG. 2 shows a perspective illustration of the door handle arrangement, which is shown in FIG. 1, without the body part.
Figure 3:
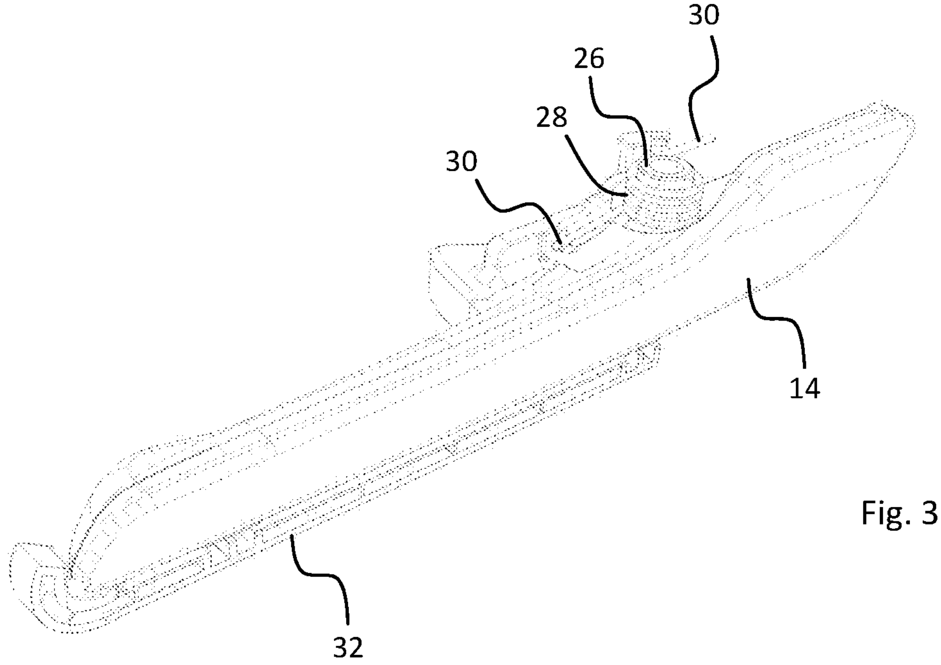
FIG. 3 shows a perspective illustration of the door handle arrangement from FIG. 2 without the housing.

For illustrative reasons, the body part 10 is not illustrated in the illustration of FIG. 2. It is thus possible to see a housing 18 of the door handle arrangement, said housing being able to be connected, in the example illustrated, by screwing via three fastening points 20 to a reinforcement (not illustrated) of the body part 10. The housing 18 has a handle cutout 22 in which the handle lever 14 is arranged. In the example shown, the handle lever 14 is mounted in the housing 18 so as to be pivotable about a pivot axis 24 running vertically in the mounted state, i.e. in the Z axis of the vehicle. As can be seen in particular in the partial illustration of FIG. 3, the handle lever 14 has an axle sleeve 26 in which the pivot axis 24 is mounted. The axle sleeve 26 is surrounded by a pretensioning spring 28, in the present case a helical spring 28, the free ends 30 of which are clamped on one side to the handle lever 14 and on the other side to the housing 18. The handle lever 14 is pretensioned into the inoperative position (shown in FIGS. 1 and 2) in the housing 18 by said pretensioning spring 28. In order to unlock and/or open a vehicle door of the vehicle which is connected to the door handle arrangement, the handle lever 14 can be pivoted at its left end in FIG. 2 out of the housing 18 manually about the pivot axis 24 counter to the pretensioning of the pretensioning spring 28.

Figure 4:
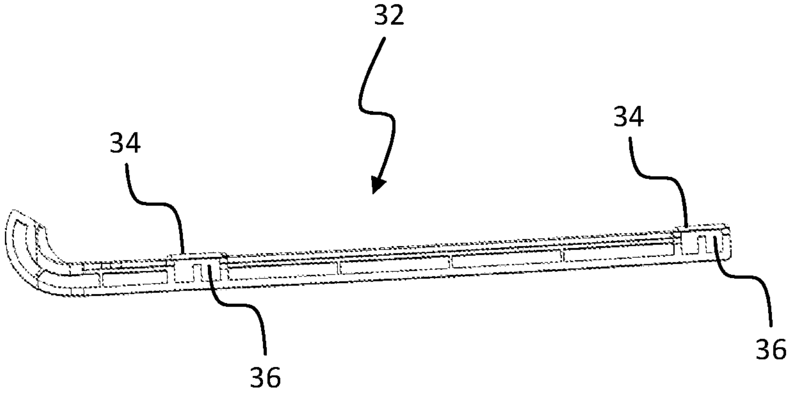
FIG. 4 shows a compensating sleeve of the door handle arrangement shown in FIG. 2.
Figure 5:
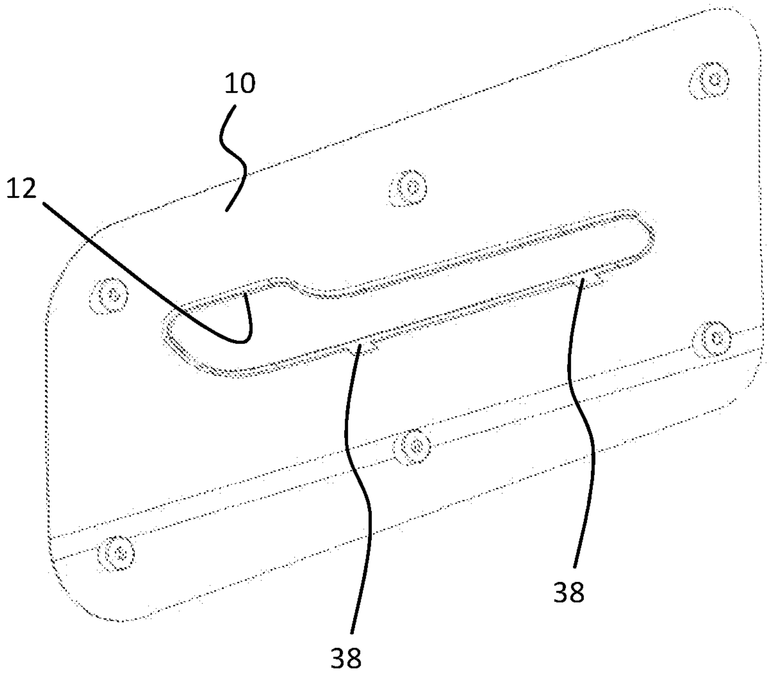
FIG. 5 shows the body part, which is shown in FIG. 1, in a rear perspective view without a door handle arrangement.

In addition, a compensating sleeve 32 which is matched to the shape of the lower side of the handle cutout 22 and the shape of the handle lever 14 is arranged on the lower side of the handle cutout 22 of the housing 18. The compensating sleeve 32 forms two contact portions 34 (see FIG. 4) for the handle lever 14. The handle lever 14 is pressed downward, in FIG. 2, onto the contact portions 34 by the pretensioning spring 28. For this purpose, the handle lever 14 is mounted with play in the handle cutout 22. In particular, the handle lever 14 is mounted with play by its axle sleeve 26 on the pivot axis 24 of the housing 18. For this purpose, the inner diameter of the axle sleeve 26 is somewhat greater than the outer diameter of the pivot axis 24. The handle lever 14 can therefore be tilted about a tilting axis running perpendicularly to the pivot axis 24. For example, in FIG. 1, the tilting axis runs through the pivot axis 24 into the plane of the drawing. In FIG. 2, for example, the left end of the handle lever 14 can be pivoted upward or downward slightly in the Z direction, as can the right end of the handle lever 14. A slight translatory movement of the handle lever 14 in the direction of the pivot axis 24, i.e. in the Z direction, can also be made possible.

Figure 6:
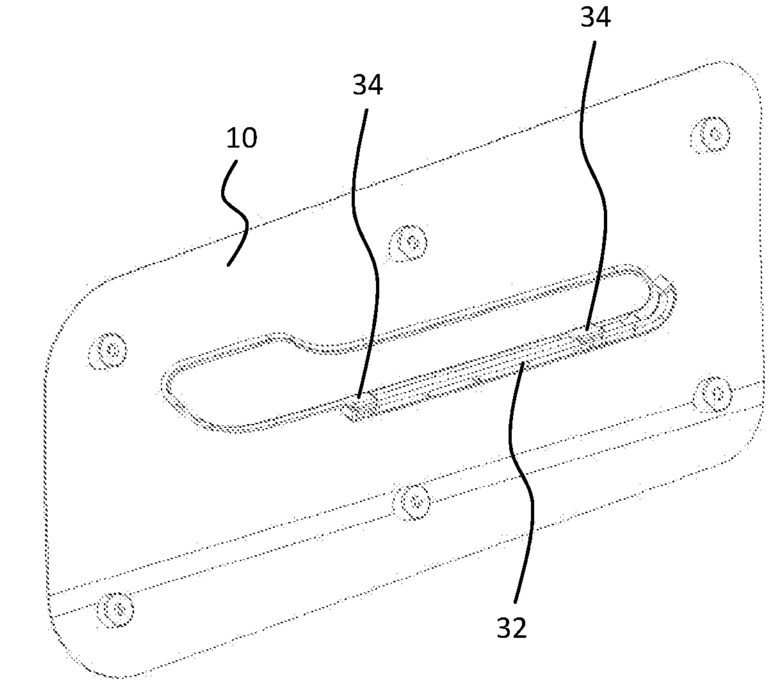
FIG. 6 shows the illustration from FIG. 5 with a compensating sleeve arranged on the body part.
Figure 7:
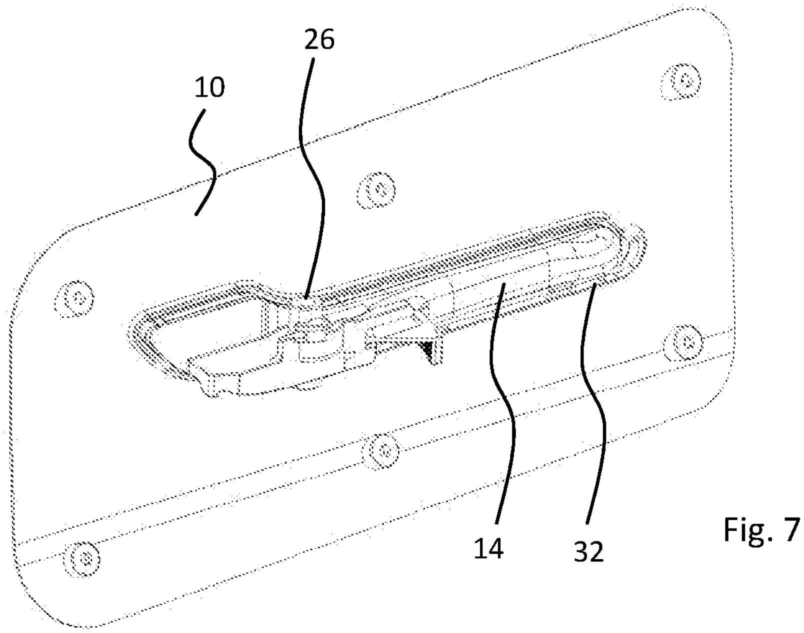
FIG. 7 shows the illustration from FIG. 6 with a handle lever also arranged on the body part.
Figure 8:
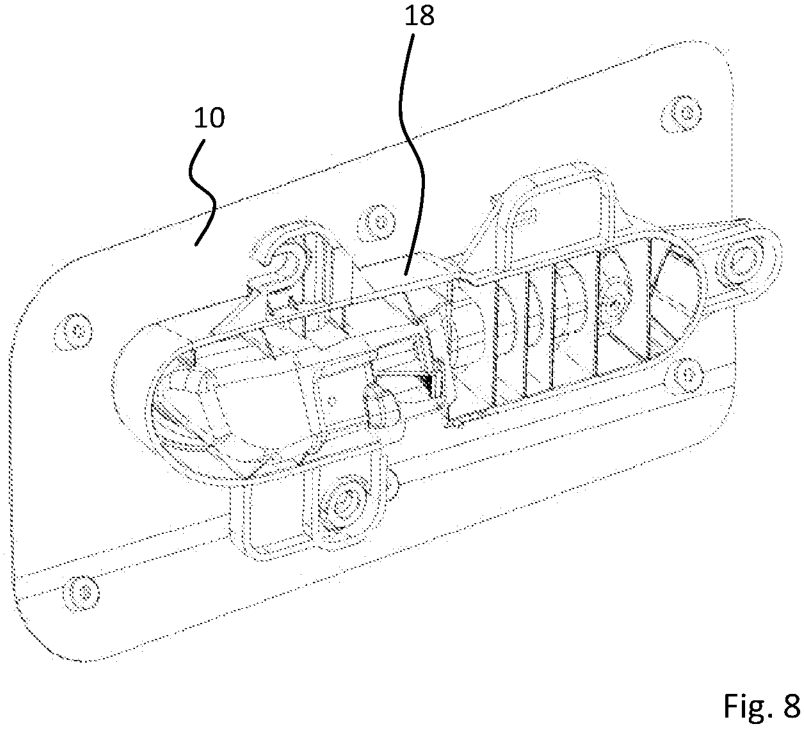
FIG. 8 shows the illustration from FIG. 7 with a housing also arranged on the body part.
Figure 9:
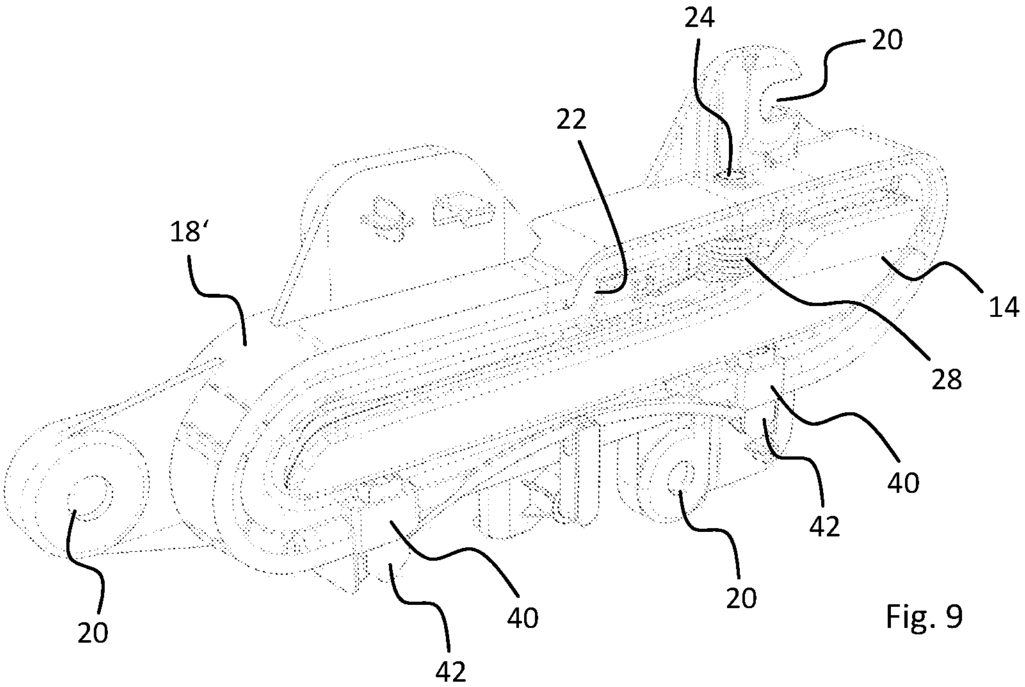
FIG. 9 shows a perspective illustration of a second exemplary embodiment of a door handle arrangement according to the invention.
Figure 10:
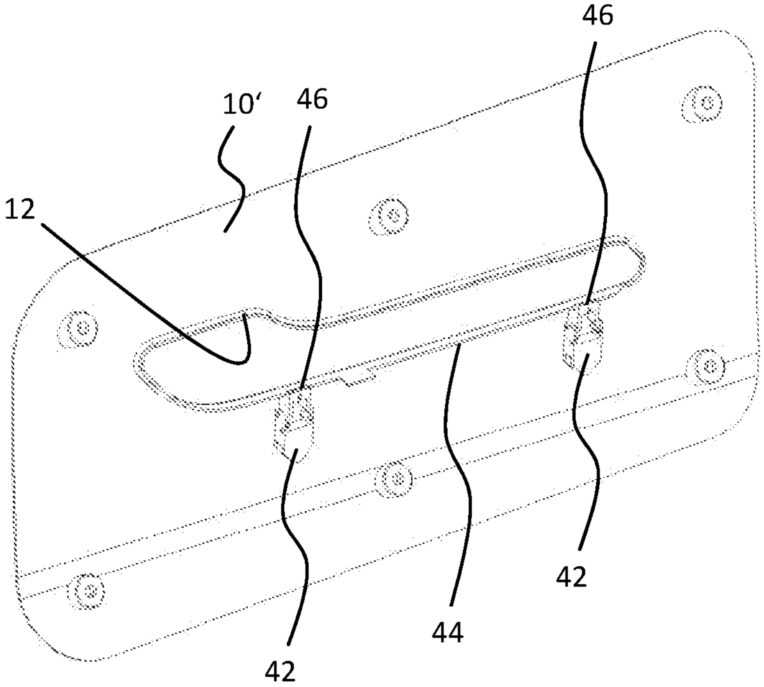
FIG. 10 shows a perspective rear view of a body part with compensating slides arranged thereon.

The compensating sleeve 32 also has two bearing portions 36 with which it is pushed onto fastening tabs 38 formed on the inner side of the body cutout 12 of the body part 10. The fastening tabs 38 are formed directly here on the edge of the body cutout 12 and are connected integrally to the body part 10. The body part 10 can be composed, for example, of a metal, such as aluminum or steel. It can be a body sheet. It would also be conceivable for the body part 10 to be composed of a plastic. The state of the compensating sleeve 32 in which the latter is pushed onto the fastening tabs 38 is shown in FIG. 6. It can be seen in FIG. 7 how the handle lever 14 rests on the contact portions 34 of the compensating sleeve 32.

The fastening tabs 38 formed directly on the body part 10 make it possible to position the compensating sleeve 32 in a defined manner with respect to the body part 10. As a result, in turn, the handle lever 14 is likewise positioned in a precisely defined manner with respect to the body part 10 and the body cutout 12 thereof via the contact portions 34, onto which the handle lever 14 is pressed by the pretensioning spring 28. This applies irrespective of possible tolerances of the components of the door handle arrangement with respect to one another or between the housing 18 and the body part 10.

The housing 18 can be composed, for example, of a glass-fiber-reinforced plastic (GFRP), such as glass fiber polyamide. The compensating sleeve 32 can be composed, for example, of a thermoplastic, such as polyoxymethylene (POM).

For the installation, first of all the handle lever 14 is inserted with the pretensioning spring 28 into the housing 18, wherein the pivot axis 24 is mounted in the axle sleeve 26. Subsequently, the compensating sleeve 32 is mounted in the housing 18. Finally, said door handle arrangement is fastened as a subassembly to the body part 10. This can take place at a different location than the installation of the door handle arrangement. Nevertheless, the precise positioning of the handle lever 14 is ensured at all times.

A second exemplary embodiment of a door handle arrangement according to the invention will be explained with reference to FIGS. 9 to 13. In the state mounted on the body part 10, said door handle arrangement also corresponds to the illustration from FIG. 1. Furthermore, the door handle arrangement according to the second exemplary embodiment also substantially corresponds to the previously explained first exemplary embodiment. It differs merely with respect to the design of the contact portions 34. A compensating sleeve 32 is thus not provided in the exemplary embodiment of FIGS. 9 to 13. Instead, in the example shown, two compensating slides 42 which are guided in a longitudinally displaceable manner in guides 40 of the housing 18' are provided. As can be seen in particular in FIG. 10, the body part 10' has a folding 44 in the region of the body cutout 12, said folding forming a contact surface 44 for the compensating slide 42. In the mounted and ready state, the compensating slides 42 enter into contact with said contact surface 44 by means of a step-shaped stop surface. At the same time, the upper side of the compensating slides 42 in each case forms a contact portion 46 for the handle lever 14, analogously to the contact portions 34 of the compensating sleeve 32 of the first exemplary embodiment.

Figure 11:
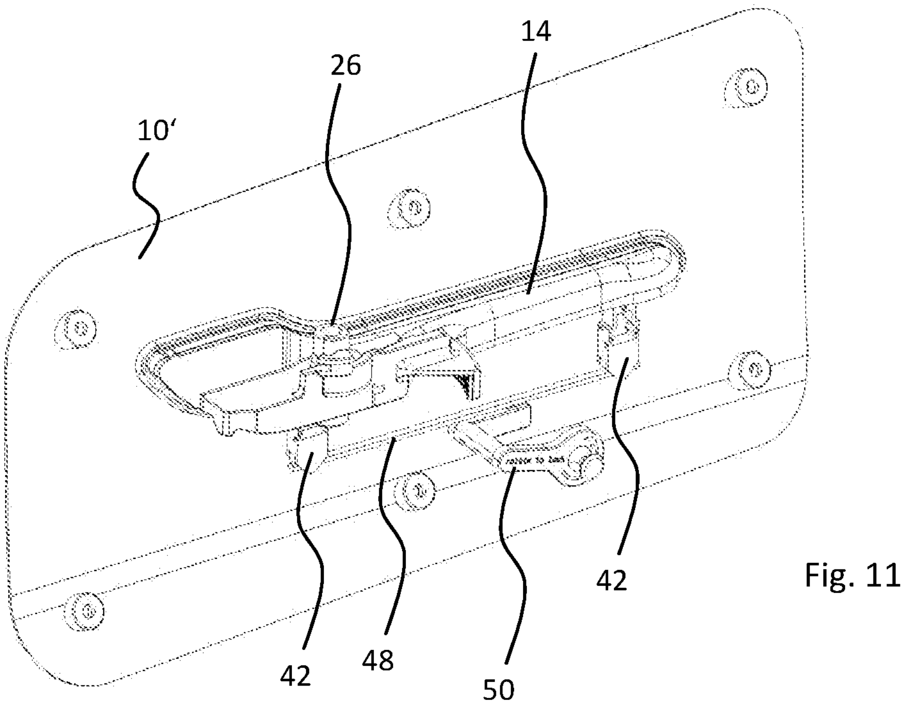
FIG. 11 shows the illustration from FIG. 10 with a handle lever also arranged on the body part in a preassembly position.
Figure 12:
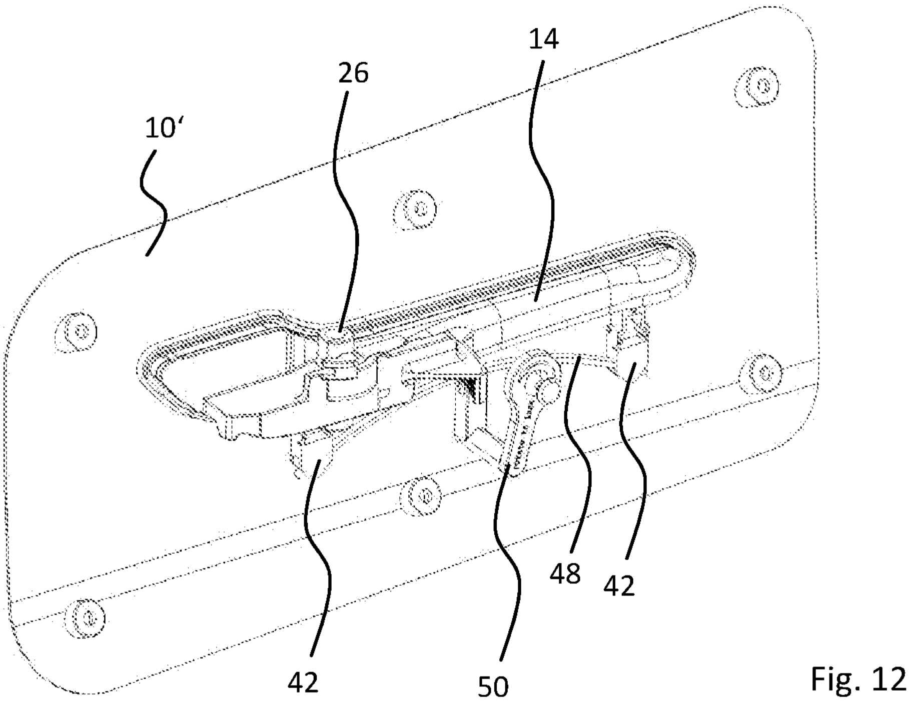
FIG. 12 shows the illustration from FIG. 11 in an installation position.
Figure 13:
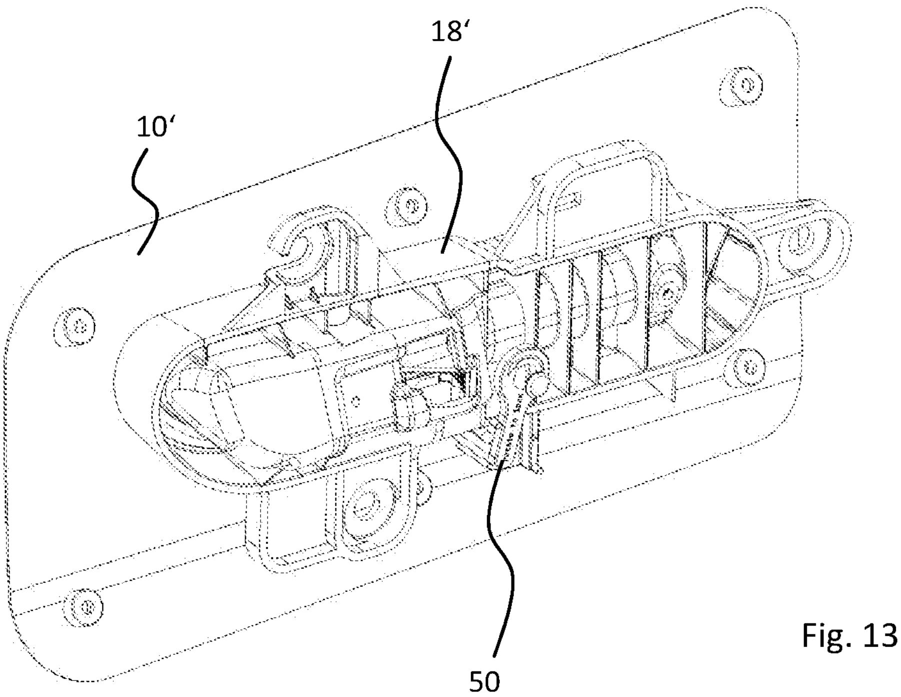
FIG. 13 shows the illustration from FIG. 12 with a housing also arranged on the body part.

The contact of the handle lever 14 against the contact portions 46 can be seen, for example, in the illustration of FIG. 11. A clamping wire 48 which interacts at each of its opposite ends with one of the compensating slides 42 can furthermore be seen in FIG. 11. An eccentric 50 acts approximately centrally on the clamping wire 48. FIG. 11 shows a preassembly state in which the compensating slides 42 are not yet clamped against the contact surface 44. In this state, the handle lever 14 can be inserted into the body cutout 12. FIG. 12 shows the installation position in which the eccentric 50 has been rotated by 90° in relation to the preassembly position. As a result, the clamping wire 48 is clamped against the compensating slides 42, and therefore the compensating slides 42 are pressed at one end against the contact surface 44 and at the other end with their contact portions 46 against the handle lever 14. In this mounted state, the handle lever 14 is in turn positioned in a defined manner with respect to the body part 10' by the compensating slides 42, which are positioned in a defined manner with respect to the body part 10', and the pretensioning spring 28 which presses the handle lever 14 onto the contact portions 46 of the compensating slides 42. This in turn applies irrespective of possible tolerances with respect to the housing 18' or between the housing 18' and the body part 10'.

For the installation, first of all the handle lever 14 is again inserted with the pretensioning spring 28 into the housing 18' and mounted with the axle sleeve 26 on the pivot axis 24. Subsequently, the compensating slides 42 are arranged in the housing 18' in the preassembly position, which is basically illustrated in FIG. 11, and mounted in the housing 18'. The door handle arrangement preassembled in this manner can subsequently be fastened to the body part 10', wherein the compensating slides 42 are then clamped against the contact surface 44 of the body part 10' at one end and against the handle lever 14 at the other end. This installation on the body part 10' can in turn take place at a different location than the preassembly of the door handle arrangement.

The body part 10' can again be composed, for example, of a metal, such as aluminum or steel. It can be a body sheet. It would also be conceivable for the body part 10' to be composed of a plastic.

The housing 18' can consist in turn, for example, of a glass-fiber-reinforced plastic (GFRP), such as glass fiber polyamide. The compensating slides 42 in turn can be composed, for example, of a thermoplastic, such as polyoxymethylene (POM).

In both exemplary embodiments according to the invention, two further contact portions are furthermore formed in the housing 18 or 18', said contact portions limiting the play (explained at the beginning) of the handle lever 14 when the handle lever 14 is deflected out of the inoperative position illustrated in the figures. In the example shown, the further contact portions interact with that end of the handle lever 14 which is closer to the pivot axis 24, the right end in FIGS. 2 and 9, in particular with the upper side and the lower side of said end of the handle lever 14. In the inoperative position of the handle lever 14, the further contact portions are not in contact with the handle lever 14. They are moved into the housing 18 or 18' and the handle lever 14 only enters the region of said further contact portions when the handle lever 14 is at least partially pivoted out of the housing 18 or 18'. In the example shown, the handle lever 14 enters the region of the further contact portions as soon as it is no longer in contact with the contact portions of the fastening sleeve 32 or the compensating slides 42. On account of the unavoidable tolerances, the further contact portions still permit a slight play of the Z direction, for example in the actuating positions of the handle lever 14 that are completely pivoted out of the housing 18 or 18'. However, this play is very small.

LIST OF REFERENCE SIGNS

10 Body part
10' Body part
12 Body cutout
14 Handle lever
18 Housing
18' Housing
20 Fastening points
22 Handle cutout
24 Pivot axis
26 Axle sleeve
28 Pretensioning spring/helical spring
30 Ends
32 Compensating sleeve
34 Contact portions
36 Bearing portions
38 Fastening tabs
40 Guides
42 Compensating slides
44 Folding/contact surface
46 Contact portions
48 Clamping wire
50 Eccentric

What is claimed is:

1. A door handle arrangement for a vehicle, comprising:
a housing having a handle cutout and multiple fastening openings;
a handle lever pivotably mounted in the handle cutout so as to be pivotable about a pivot axis between an inoperative position and an actuating position, wherein the handle lever is mounted with play in the handle cutout for movement axially along the pivot axis;
at least one compensating element including at least one contact portion for the handle lever, wherein the handle lever is pretensioned by a spring both into the inoperative position and, when in the inoperative position, axially along the pivot axis against the at least one contact portion of the compensating element;
wherein the at least one contact portion is arranged on a side of the handle cutout which is a lower side in a mounted state of the door handle arrangement;
wherein the at least one compensating element is formed by at least two compensating slides, wherein each compensating slide is guided displaceably in a respective guide of the housing, wherein each compensating slide forms a contact portion for the handle lever.

2. The door handle arrangement as claimed in claim 1, wherein the at least one compensating element is formed by at least one compensating sleeve.

3. The door handle arrangement as claimed in claim 2, wherein the compensating sleeve is arranged on a side of the handle cutout which is a lower side in a mounted state of the door handle arrangement.

4. The door handle arrangement as claimed in claim 1, wherein the compensating slides are arranged on a side of the handle cutout which is a lower side in a mounted state of the door handle arrangement.

5. The door handle arrangement as claimed in claim 1, wherein the at least one compensating element is formed from polyoxymethylene.

6. A system comprising a body part of a vehicle and a door handle arrangement as claimed in claim 1, the door handle arrangement fastened to the body part.

7. The system as claimed in claim 6, wherein a body cutout for the handle lever is formed in an outer surface of the body part of the vehicle, wherein, when the handle lever is in the inoperative position, the handle lever ends flush with the outer surface which surrounds the body cutout.

8. The system as claimed in claim 7, wherein, in the inoperative position of the handle lever, there is a surrounding gap of less than 2 mm between the handle lever and an edge of the body cutout.

9. A door handle arrangement for a vehicle, comprising:

a housing having a handle cutout, multiple fastening openings, and a pivot axis having an outer diameter;

a handle lever including a mounting sleeve portion engaged on the pivot axis so as to be pivotably mounted in the handle cutout for pivoting about the pivot axis between an inoperative position and an actuating position, wherein the mounting sleeve portion includes an inner diameter that is greater than the outer diameter of the pivot axis so as to be mounted with play relative to the housing both (i) axially along the pivot axis and (ii) tiltably about a tilting axis that runs perpendicular to the pivot axis; and a compensating sleeve including first and second contact portions for the handle lever;

wherein the compensating sleeve is configured to be fastened directly to at least one fastening portion of a vehicle body part.

10. The door handle arrangement of claim 9, further comprising:

a spring positioned to bias the handle lever both into the inoperative position and, when in the inoperative position, at least axially along the pivot axis against the first and second contact portions of the compensating element.

11. The door handle arrangement of claim 10, wherein the spring includes a helical body and a free end that extends away from the helical body, such that the free end contacts the handle lever at a location spaced from the helical body.

12. A system comprising a body part of a vehicle and a door handle arrangement as claimed in claim 9, the door handle arrangement fastened to the body part, wherein the housing is fastened to the body part via the multiple fastening openings and the compensating sleeve is fastened directly to at least one tab of the body part so as to define a position of the first and second contact portions relative to a body cutout of the body part.

13. A system, comprising:

a body part of a vehicle and a door handle arrangement, the door handle arrangement fastened to the body part;

wherein the body part includes at least one tab and a body cutout;

wherein the door handle arrangement comprises:

a housing having a handle cutout, multiple fastening openings, and a pivot axis having an outer diameter;

a handle lever including a mounting sleeve portion engaged on the pivot axis so as to be pivotably mounted in the handle cutout for pivoting about the pivot axis between an inoperative position and an actuating position, wherein the mounting sleeve portion includes an inner diameter that is greater than the outer diameter of the pivot axis so as to be mounted with play relative to the housing both (i) axially along the pivot axis and (ii) tiltably about a tilting axis that runs perpendicular to the pivot axis; and a compensating sleeve including first and second contact portions for the handle lever;

wherein the housing is fastened to the body part via the multiple fastening openings and the compensating sleeve is fastened directly to the at least one tab so as to define a position of the first and second contact portions relative to the body cutout.

* * * * *